United States Patent
Matsuura

(10) Patent No.: US 6,675,090 B2
(45) Date of Patent: Jan. 6, 2004

(54) CURVE APPROACH DEVICE, AND VEHICLE EQUIPPED WITH CURVE APPROACH DEVICE

(75) Inventor: Munenori Matsuura, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 71 days.

(21) Appl. No.: 10/123,125

(22) Filed: Apr. 15, 2002

(65) Prior Publication Data

US 2002/0161510 A1 Oct. 31, 2002

(30) Foreign Application Priority Data

Apr. 26, 2001 (JP) ........................................ 2001-130052

(51) Int. Cl.$^7$ ............................................... G01C 21/00
(52) U.S. Cl. ........................ 701/200; 701/213; 701/208
(58) Field of Search ................................. 701/200–213, 701/79; 340/988, 990, 995

(56) References Cited

U.S. PATENT DOCUMENTS 6,298,296 B1 * 10/2001 Takahashi ................... 704/208
6,343,253 B1 * 1/2002 Matsaura et al. ........... 701/200

FOREIGN PATENT DOCUMENTS

| EP | 0819912 | 1/1998 | ............ G01C/21/20 |
| EP | 0901929 | 3/1999 | ............ B60K/31/00 |
| EP | 0933272 | 8/1999 | ............ B60T/8/00 |
| EP | 1074421 | 2/2001 | ............ B60K/31/00 |
| EP | 1083535 | 3/2001 | ............ G08G/1/0968 |
| EP | 1085296 | 3/2001 | ............ G01C/21/34 |
| EP | 1086844 | 3/2001 | ............ B60K/31/00 |
| EP | 1087358 | 3/2001 | ............ G08G/1/0968 |
| JP | 04-236699 | 8/1992 | ............ G08G/1/16 |

* cited by examiner

*Primary Examiner*—Richard M. Camby
(74) *Attorney, Agent, or Firm*—Darby & Darby

(57) ABSTRACT

When a curve exists in the direction of travel of a vehicle and information for this curve is inputted from a navigation system and the shape of the actual curve in the road changes gently with respect to the curve shape of the navigation system, the change in the curvature of the actual curve actually becomes smaller based on an integral value of the yaw rate, vehicle speed, and the yaw rate. It is then detected that the navigation system and the actual vehicle behavior of the system do not coincide, and the output of unnecessary control commands such as alarms, deceleration and steering and the like is halted. Namely, it is judged that curve information from the navigation system is erroneous, and outputting of unnecessary control commands can be avoided before something happens.

11 Claims, 4 Drawing Sheets

CURVE APPROACH DEVICE, AND VEHICLE EQUIPPED WITH CURVE APPROACH DEVICE

BACKGROUND OF THE INVENTION

1. Field of the Invention

The present invention relates to a curve approach control device for estimating and judging the approach of a curve ahead for a vehicle based on information from a navigation system, and warning alarms and controlling deceleration and soon, and a vehicle equipped with this curve approach control device.

2. Description of Related Art

In the related art, a large number of curve approach control devices and vehicles equipped with such curve approach devices have been proposed where it is detected whether a vehicle is traveling too fast for an approaching curve using road map data and the like of the navigation system and alarms are then issued or control is exerted to decelerate.

For example, in Japanese Application Laid Open No. 4-236699, there is disclosed technology where an appropriate vehicle approach speed is calculated according to road characteristics such as the radius of curvature of the curve based on information for a curve the vehicle is approaching provided by the navigation system. When the actual vehicle speed is higher than this appropriate vehicle approach speed, the driver is notified of this and is commanded to reduce speed, or control is exerted to automatically decelerate according to this command.

However, map data for the navigation system is not usually updated with the most recent information, but is rather updated periodically. There are therefore many occasions where the road data for the navigation system and the actual shape of the road are not the same.

There is therefore a strong possibility of erroneous judgments occurring with regards to alarms for the approach of a curve and deceleration control of the vehicle that rely upon curve information from the navigation system. Such unnecessary alarms and the like not only make the driver feel uncomfortable, but also cause drivability to deteriorate.

In order to resolve the aforementioned situation it is therefore the object of the present invention to provide a curve approach control device and a vehicle equipped with this curve approach control device capable of judging when curve information supplied by the navigation system is erroneous and avoiding the outputting of unnecessary control commands before something happens.

SUMMARY OF THE INVENTION

A curve approach control device for predicting and judging the approach of a curve based on information for a curve ahead for a vehicle and outputting prescribed control commands comprises means for comparing and judging coincidence between curve information supplied by a navigation system and actual curve information based on actual vehicle behavior, and means for stopping outputting of the control commands when it is judged that the curve information from the navigation system and the actual curve information do not coincide.

The above and other objects, features and advantages of the invention will become more clearly understood from the following description referring to the accompanying drawings.

DETAILED DESCRIPTION OF PREFERRED EMBODIMENTS

The following is a description based on FIG. 1 to FIG. 4 of a preferred embodiment of the present invention.

Figure 1:
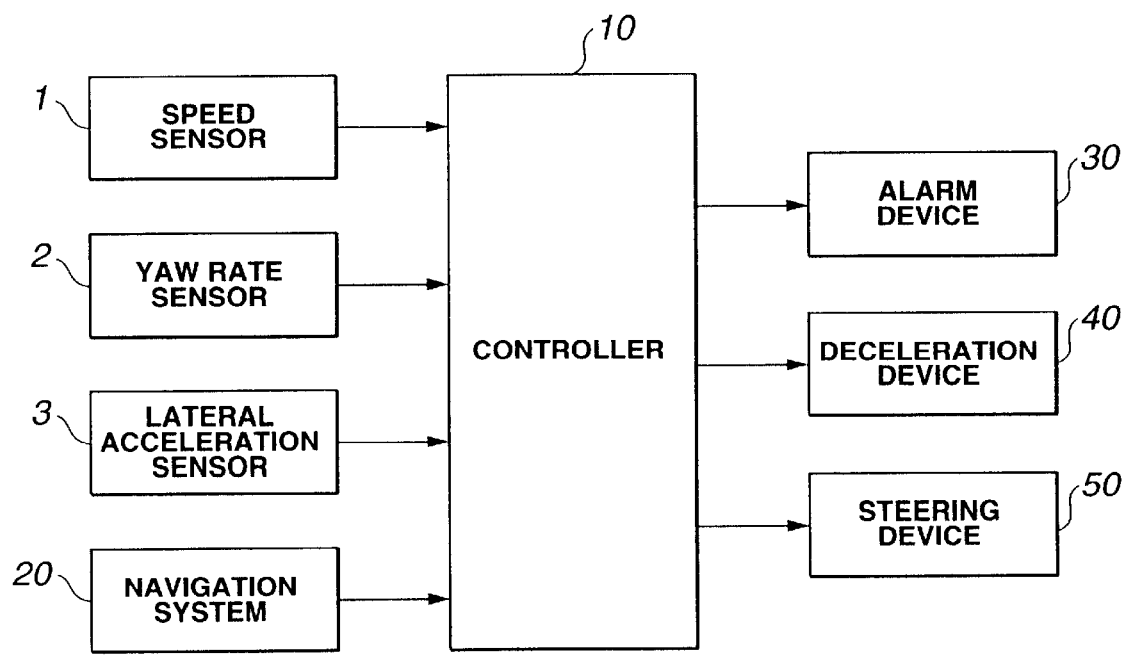
FIG. 1 is an overall structural view of a curve approach control device.

In FIG. 1, numeral 10 is a controller constituting the main component of the curve approach control device and includes a microcomputer and other peripheral circuits. Information from sensors for detecting vehicle behavior such as a speed sensor 1, a yaw rate sensor 2, and a lateral acceleration sensor 3 and so on is inputted to the controller 10 either directly or through communication between units. Road information from a well-known navigation system 20 is also inputted through communication between the units.

At the controller 10, it is judged whether or not the vehicle equipped with the controller 10 can negotiate an approaching curve in a sufficiently stable manner based mainly on information from the navigation system 20, and an alarm device 30 such as a buzzer, a sound alarm or a warning light is driven as necessary in order to notify the driver.

When it is necessary to forcibly decelerate, the controller 10 outputs a decelerate command to a deceleration device 40 and control is then exerted to decelerate by shifting down the transmission, reducing engine torque, or by braking, and so on. Further, when the steering angle with respect to the curve is inappropriate to an extent that is considered to be unsafe, a steering angle correction command is outputted to a steering device 50 and steering is controlled.

The reliability of curve information calculated based on road information from the navigation system 20 is then verified at the controller 10 using real curve information calculated from turning motion parameters expressing the actual behavior of the vehicle as detected by the sensors (navigation matching). When curve information from the navigation system 20 does not match with real curve information based on actual vehicle behavior, data (navigation data) from the navigation system 20 is judged to not be reliable. Control commands for alarms, deceleration and steering and the like are then halted for a set travel distance, set time, or until mismatching no longer applies, and erroneous operation is therefore prevented from occurring.

The node number pertaining to the travel route of the vehicle, the latitude and longitude (east longitude, north latitude) of the vehicle position, data relating to a node directly after the vehicle, and data relating to a node for the travel route of the vehicle within a set range ahead for the vehicle are output from the navigation system 20 at intervals of prescribed distances so as to be included in information for the type of road and road width, and the like. At the controller 10, the angle for every node and the curvature of the curve (navigation curvature) are calculated based on position information for every node sent from the navigation system 20, the total value (total navigation angle) of node angles for the same curve are obtained as curve depth, the node point having the largest curve curvature (smallest curve radius of curvature) within the same curve is detected, and the curvature of this node is obtained as the maximum navigation curvature.

Figure 2A:
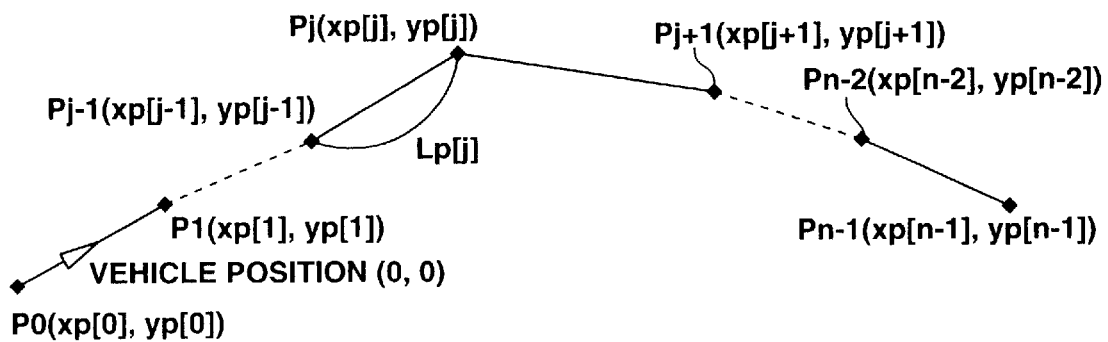
FIG. 2A is a view illustrating intervals between nodes taken as a reference for vehicle position sent from the navigation system.
Figure 2B:
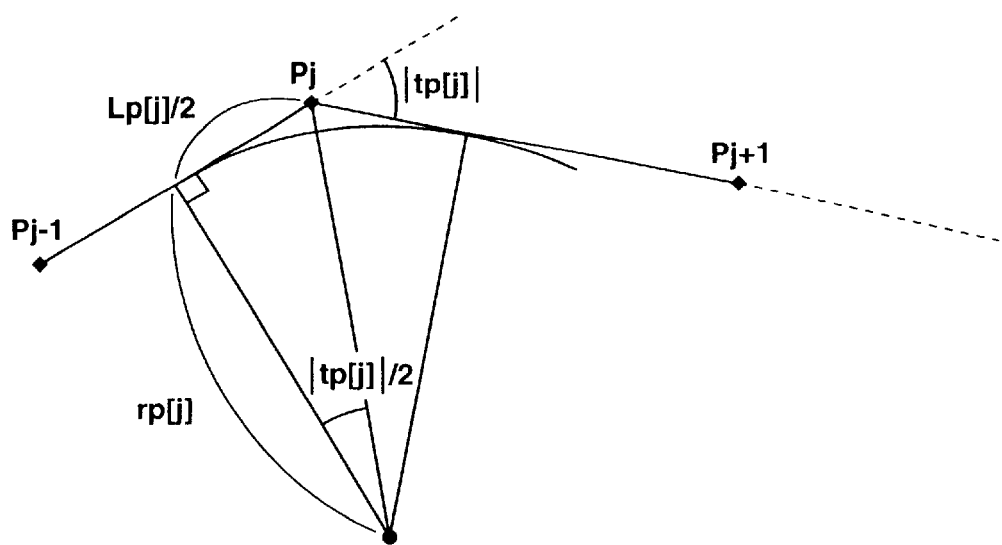
FIG. 2B is a view illustrating the node angle and the radius of curvature of the curve calculated based on the information in FIG. 2A.

Specifically, as shown in FIG. 2A, an interval $Lp[j]$ between a node $Pj(xp[j], yp[j])$ and a previous node $Pj-1$ $(xp[j-1], yp[j-1])$ is calculated for each node using the following equation (1) using node coordinates referencing the vehicle position sent from the navigation system 20. Next, as shown in FIG. 2B, a node angle $tp[j]$ for each node $Pj$ is calculated using the following equation (2) based on the node coordinates, and radius of curvature $rp[j]$ at node $Pj$ is then calculated using the following equation (3) based on the results of this calculation. The node angle $tp[j]$ obtained here is then expressed as a positive value in the case of a right corner and as a negative value in the case of a left corner. Here, $\min(Lp[j], Lp[j+1])$ in equation (3) is for selecting whichever is the shortest of $Lp[j]$ and $Lp[j+1]$, and in FIG. 2B, as $Lp[j]<Lp[j+1]$, $\min(Lp[j], Lp[j+1])=Lp[j]$.

$$Lp[j]=((xp[j]-xp[j-1])2+(yp[j]-yp[j-1])2)^{\frac{1}{2}} \quad (1)$$

(where $1 \leq j \leq n-1$)

$$tp[j]=\sin^{-1}(((xp[j-1]-xp[j])\cdot(yp[j]-yp[j+1])-(xp[j]-xp[j+1])\cdot(yp[j-1]-yp[j]))/(Lp[j]\cdot Lp[j+1])) \quad (2)$$

$$rp[j]=\min(Lp[j], Lp[j+1])/2/\tan(|tp[j]|/2) \quad (3)$$

The maximum value of the curvature (maximum navigation curvature) $s\_nm\_rnavi\_max$ within the same curve is then obtained based on the results of the above calculation and the total navigation angle (curve depth) $s\_nm\_tnavi$ is then obtained by adding previous node angles for each node for the plurality of nodes included in the same curve. Judgment of the same curve is carried out by identifying whether or not neighboring nodes are nodes making up the same curve based on node angles $tp[j]$ for each node, each node interval $Lp[j]$ and road width attribute information.

Namely, when the node interval $Lp[j]$ is smaller than an interval set based on the road width attribute, and code of $tp[j-1]$ and $tp[j]$ for the various node angles showing the direction of curve at each node are the same, it is judged that the nodes $Pj-1$ and $Pj$ are consecutive parts of the same curve. The adoption of an interval corresponding to the road width attribute as a threshold value for the node interval $Lp[j]$ in the same curve judgment is to provide compatibility with the tendency whereby radius of curvature is larger for wider roads, so that the spacing between nodes on the curve becomes large.

At the same time, a yaw rate $\gamma$ from the yaw rate sensor 2 is used at the controller 10 as a turning motion parameter expressing the actual behavior of the vehicle. The value $\int \gamma dt$ that is the integral of the yaw rate $\gamma$ at the section corresponding to navigation data for the same curve is then obtained as a yaw angle $s\_nm\_psi$ corresponding to the curve depth (total navigation angle) $s\_nm\_tnavi$. A highest value (highest real curvature) $s\_nm\_rpsi\_max$ for a curvature obtained from actual vehicle behavior using turning radius ($\cong V/\gamma$) calculated from vehicle speed V from the speed sensor 1 and yaw rate $\gamma$ from the yaw rate sensor 2 is obtained as a parameter corresponding to the highest navigation curvature $s\_nm\_rnavi\_max$. The highest real curvature can also be calculated from the speed and the lateral acceleration.

It is then investigated whether or not a difference between a curve depth $s\_nm\_tnavi$ based on the navigation data and a yaw angle $s\_nm\_psi$ based on actual behavior of the vehicle, and the difference between a highest navigation curvature $s\_nm\_rnavi\_max$ based on navigation data and a highest curvature $s\_nm\_rpsi\_max$ based on actual vehicle behavior, are within a set range. If these are within a set range, then actual vehicle behavior matches with the navigation data and it is judged that the navigation data is reliable. On the other hand, when the difference between the curve depth $s\_nm\_tnavi$ and the yaw angle $s\_nm\_psi$ or the difference between the highest navigation curvature $s\_nm\_rnavi\_max$ and the highest real curvature $s\_nm\_rpsi\_max$ is not within the set range, the actual vehicle behavior does not match with the navigation data and the navigation data is therefore judged to be unreliable. Output of control commands to the alarm device 30, deceleration device 40 and steering device 50 is then halted.

Figure 3A:
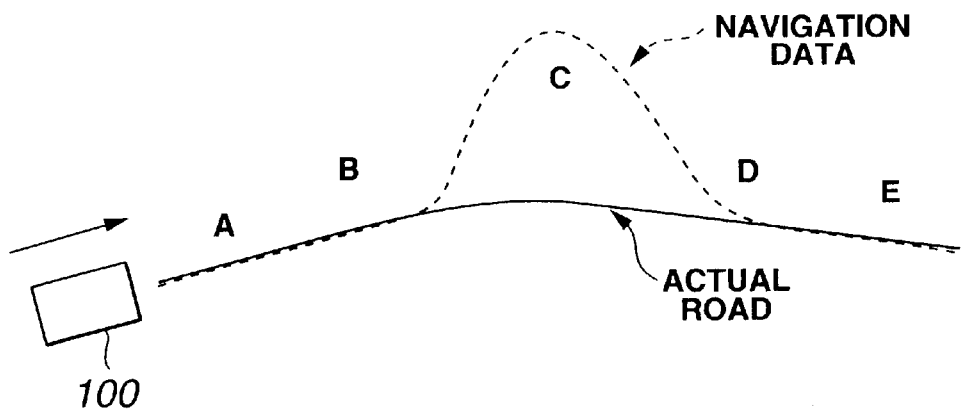
FIG. 3A is an illustration showing an example of an actual curve ahead for a vehicle and curve information inputted from a navigation system.
Figure 3B:
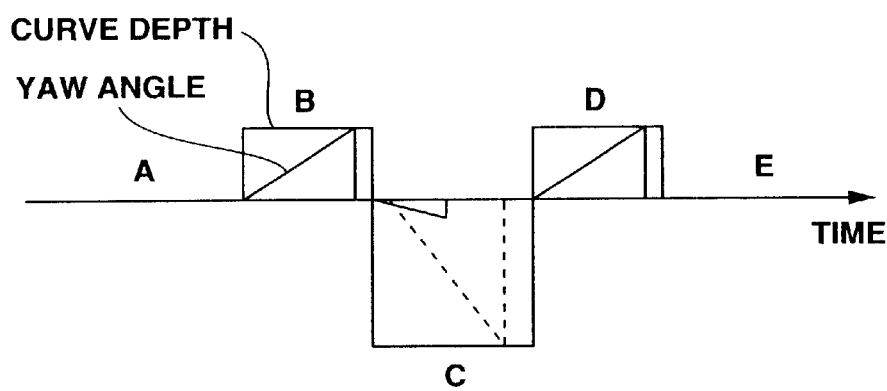
FIG. 3B is a view illustrating an example of curve depth obtained from the navigation system and an integral value of detected yaw rate for the case in FIG. 3A.
Figure 3C:
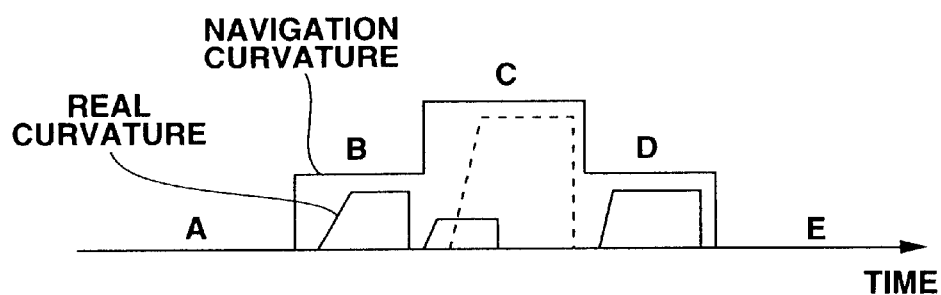
FIG. 3C is a view illustrating an example of actual curvature based on maximum curvature obtained from the navigation system data and actual vehicle behavior calculated from detected vehicle speed and yaw rate for the case in FIG. 3A.

Namely, as shown in FIG. 3A, a description is given of the case where there is a curve shown by a solid line in the direction of travel of a vehicle 100. When curve information shown by a dotted line is inputted from the navigation system 20, at a section B where curve information from the navigation system 20 and the actual curve of the road match, as shown in FIG. 3B, an integral value of a yaw rate detected by the yaw rate sensor 2 gradually increases with respect to the curve depth obtained from the navigation data according to a change in the actual vehicle yaw rate and reaches a prescribed peak value so that the mutual differences are within the set range. As shown in FIG. 3C, the real curvature based on actual vehicle behavior calculated from vehicle speed and yaw rate gradually increases with respect to the highest curvature of the curve (highest navigation curvature) obtained from the navigation data so as to reach a fixed value (highest real curvature) and the mutual differences are then within a set range. It is not therefore detected at this time that the navigation data and the actual vehicle behavior do not coincide.

Next, in section B to C, the real curvature calculated from the integral value of the yaw rate, the vehicle speed, and the yaw rate should change in the manner shown by the dotted line provided that the actual curve shape and the navigation data curve shape are substantially the same. However, as the shape of the actual road curve gently changes with respect to the shape of the navigation data curve, change in the real curvature based on the integral value of the yaw rate, vehicle speed and yaw rate becomes small as shown by the solid lines in FIG. 3B and FIG. 3C and is reset at the point where the curvature for the actual road becomes small in the vicinity of the end of section B (when the curve is gentle so that the change in the yaw rate is less than the set value, this can be seen from calculation as a substantially straight line, and the saved value is cleared). Mismatching between the navigation data and the actual vehicle behavior is therefore detected at this time, and the outputting of commands controlling alarms, deceleration and steering and the like are then halted for a fixed distance, a fixed time, or until it is confirmed in the section D that the navigation data and the actual behavior of the vehicle match.

When the vehicle is not positioned on road map data that is possesses itself in the form of the navigation system 20, for example, when a partial detour is in place due to road works being in progress on the actual road and the vehicle follows this detour, or when the part of the actual road is in the form of a short-cut, and the like, data for the road ahead intended for output by the navigation system 20 is not outputted and only the east longitude and north latitude for the vehicle position are outputted. If, even when traveling normally, the vehicle position goes temporarily out from the road map data within the navigation system 20 in the vicinity of a curve or crossroads due to a position error between the road map data within the navigation system 20 and the actual road or because of an error in the absolute position of the vehicle provided by a GPS, data for the road ahead intended for output by the navigation system 20 is not outputted and just the east longitude and north latitude for the vehicle position are outputted. In such cases it is not possible to get matching between the navigation data and the actual vehicle behavior. The outputting of commands for controlling alarms, deceleration and steering is therefore halted immediately by the controller 10 without having to perform judgments until there is matching.

Figure 4:
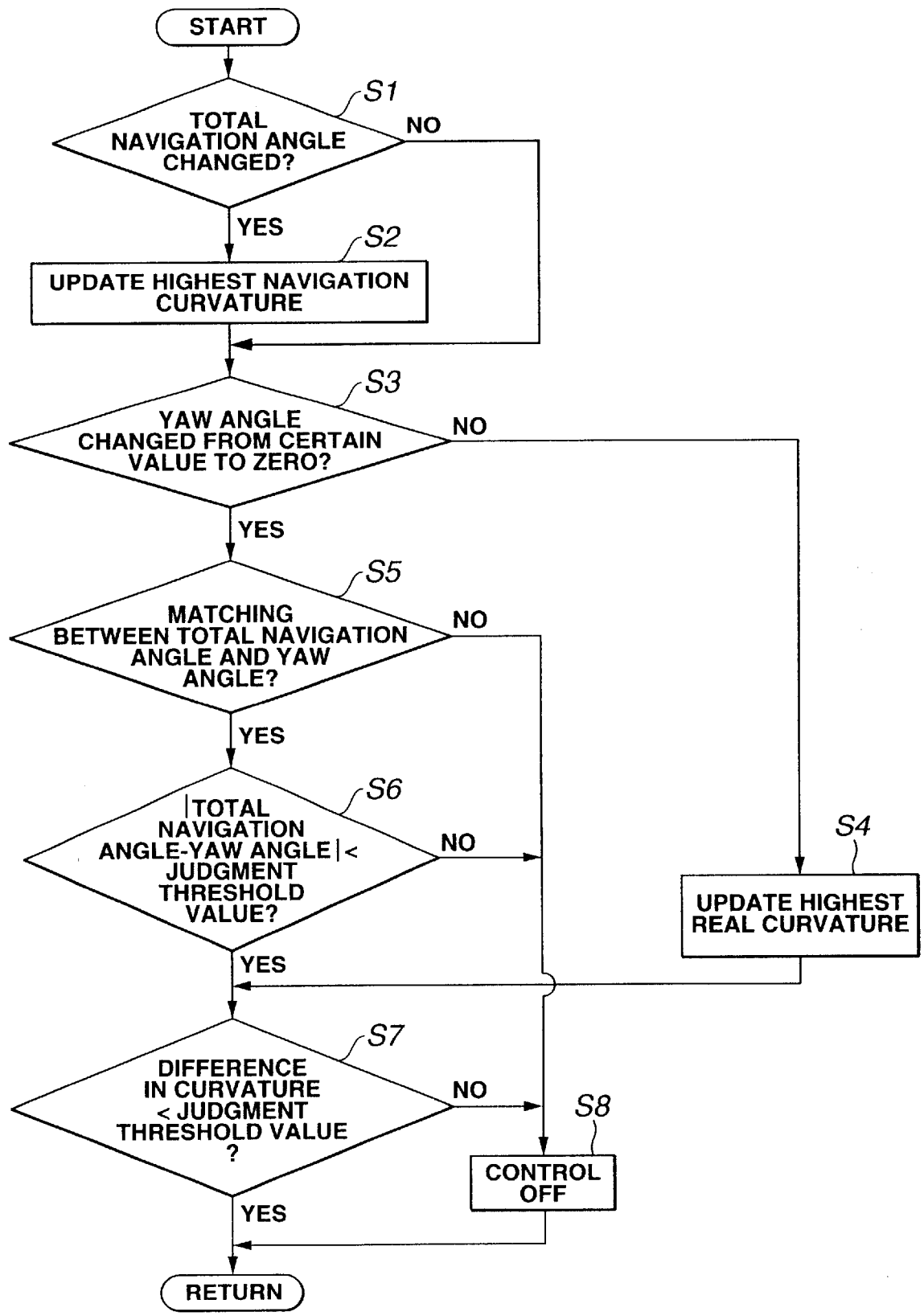
FIG. 4 is a flowchart of a routine for a navigation system matching process.

The following is a description using the flowchart shown in FIG. 4 of the navigation matching process of the controller 10.

In this matching process, first, in step S1, the controller 10 judges whether or not the current value for the total navigation angle $s\_nm\_tnavi$ for this time has changed anew with respect to a saved value for the previous time based on node data from the navigation system 20. When the current value for the total navigation angle $s\_nm\_tnavi$ has not changed with respect to the saved value, step S3 is proceeded to. When the current value of the total navigation angle $s\_nm\_tnavi$ is changed anew with respect to the saved value, step S2 is proceeded to, the saved value for the highest navigation curvature for the previous time and before is substituted with the value for this time, the highest navigation curvature $s\_nm\_rnavi\_max$ is updated, and step S3 is proceeded to.

Next, in step S3, the controller 10 checks as to whether or not the value for this time has been changed from a prescribed value to zero, with the saved value for the previous time and before for the yaw angle $s\_nm\_psi$ being a prescribed value other than zero. Namely, in this method, the controller 10 executes a separate routine to perform processing to integrate the yaw rate $\gamma$ supplied by the yaw rate sensor 2 and obtain a yaw angle $s\_nm\_psi$. When the yaw rate $\gamma$ is a prescribed value or less, this appears as a straight line and zero is substituted into the yaw angle $s\_nm\_psi$. After the controller 10 advances from step S3 to step S4 when the yaw angle $s\_nm\_psi$ is not changed from the prescribed value to zero, i.e. in the case of being within the same curve, and the controller 10 updates the highest real curvature $s\_nm\_rpsi\_max$ according to results of comparing the saved value for the real curvature for the previous time and beforehand and the value for this time based on the vehicle speed V and the yaw rate $\gamma$, step S7 is proceeded to and processing is carried out to verify the reliability of navigation data from the highest navigation curvature $s\_nm\_rnavi\_max$ and the highest curvature $s\_nm\_rpsi\_max$. When the yaw angle $s\_nm\_psi$ is changed to zero from the prescribed value, the controller 10 proceeds from step S3 to step S5 and a process is carried out to verify the reliability of navigation data from the total navigation angle (curve depth) $s\_nm\_tnavi$ and the yaw angle $s\_nm\_psi$.

In step S5 it is judged whether or not the total navigation angle $s\_nm\_tnavi$ and the yaw angle $s\_nm\_psi$ match. When there is no matching and mutual polarities do not coincide, step S8 is branched to, and the process of going through a control OFF evaluation process to suspend control commands for alarms, deceleration and steering and the like is carried out. Namely, the polarities of the total navigation angle $s\_nm\_tnavi$ and the yaw angle $s\_nm\_psi$ are different and if the mutual difference is slight, then there are cases where this is within the permitted range for matching even when the direction of the curve from the navigation system 20 and the direction of the curve obtained from the actual behavior of the vehicle do not match. Therefore, under these kinds of conditions, the controller 10 performs evaluation taking non-matching of polarities as one condition for halting the outputting of control commands due to non-matching with the real curve information based on curve information from the navigation system 20 and actual vehicle behavior. Evaluation is performed here with regards to the polarity of the total navigation angle $s\_nm\_tnavi$ and the polarity of the yaw angle $s\_nm\_psi$ but the same also applies to the highest navigation curvature $s\_nm\_rnavi\_max$ and the highest real curvature $s\_nm\_rpsi\_max$.

Next, when the total navigation angle $s\_nm\_tnavi$ and the yaw angle $s\_nm\_psi$ match and the mutual polarities also match, step S6 is proceeded to from step S5 and a judgment is made as to whether or not an absolute value of the difference between the total navigation angle $s\_nm\_tnavi$ and the yaw angle $s\_nm\_psi$ is smaller than a judgment threshold value. In step S6, when $|s\_nm\_tnavi-s\_nm\_psi| \geq$ the judgment threshold value, the routine for evaluation processing of the OFF control in step S8 is carried out, and when $|s\_nm\_tnavi-s\_nm\_psi| <$ the judgment threshold value, step S7 is proceeded to and a check is made as to whether or not a difference in the curvature of the highest navigation curvature $s\_nm\_rnavi\_max$ and the highest real curvature $s\_nm\_rpsi\_max$ is smaller than the judgment threshold value. When this result is such that the difference in the curvature is $\geq$ the judgment threshold value, the routine for carrying out evaluation processing of the OFF control in step S8 is carried, and when the difference in the curvature < the judgment threshold value, the actual vehicle behavior matches with the navigation data, the navigation data is judged to be reliable, and the routine is executed as is.

For example, a reliability counter for counting reliability is provided and the control OFF evaluation processing is then carried out referring to this reliability counter. The value of the reliability counter is made to count up or to count down according to each of the judgment results with respect to the matching/non-matching of the mutual polarities of the highest navigation curvature $s\_nm\_rnavi\_max$ and the highest real curvature $s\_nm\_rpsi\_max$, the matching/non-matching of the mutual polarities of the total navigation angle $s\_nm\_tnavi$ and the yaw angle $s\_nm\_psi$, the difference between the total navigation angle $s\_nm\_tnavi$ and the yaw angle $s\_nm\_psi$, and the differences between the curvatures for the highest navigation curvature $s\_nm\_rnavi\_max$ and the highest real curvature $s\_nm\_rpsi\_max$. When, for example, there are two consecutive erroneous judgments, the output of control commands for alarms, deceleration and steering and the like is immediately put to a level for halting.

In this case, when it is again judged that the navigation data is not reliable with the control commands for alarms, deceleration and steering and so on being halted, the period for which the control commands are halted may be extended over a prescribed time range or by a prescribed distance.

In this embodiment, because the reliability of curve information based on navigation data is verified using real curve information based on actual vehicle behavior, the unnecessary outputting of control commands for alarms, deceleration and steering and the like does not occur. The driver is therefore not subjected to any discomfort, deterioration of drivability during driving is prevented, and control is improved.

In this embodiment, the reliability of the navigation data is evaluated using both the difference between a curve depth (total navigation angle) based on the navigation data and a yaw angle based on actual vehicle behavior, and a difference between highest value (highest navigation curvature) of the curve curvature based on navigation data and a highest value (highest real curvature) of a curve curvature based on actual vehicle behavior. However, the reliability of the navigation data may also be evaluated using just one of these differences.

According to the present invention described above, errors in curve information from a navigation system can be judged using real curve information based on vehicle behavior. The unnecessary output of control commands can therefore be prevented from happening and control can therefore be improved.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A curve approach control device for predicting and judging the approach of a curve based on information for a curve ahead for a vehicle and outputting prescribed control commands comprising:

means for comparing and judging matching between curve information supplied by a navigation system and real curve information based on actual vehicle behavior, and means for stopping outputting of the control commands when it is judged that the curve information from the navigation system and the real curve information do not match.

2. The curve approach control device of claim 1, wherein curve information from the navigation system is represented by curve depth calculated from node data relating to a road, the real curve information is represented by a value arrived at by integrating a turning motion parameter of the vehicle, and when a difference between the curve depth and the integral value for the turning motion parameter is a threshold value or more, it is judged that the curve information from the navigation system and the real curve information do not match.

3. The curve approach control device of claim 2, wherein non-matching of polarities of the curve depth and the integral value of the turning motion parameter is taken as one condition for judging that the curve information from the navigation system and the real curve information do not match.

4. The curve approach control device of claim 2, wherein the turning motion parameter is yaw rate or lateral acceleration.

5. The curve approach control device of claim 2, wherein halting of outputting of the control commands continues for a set distance, a set time, or until mismatching is resolved.

6. The curve approach control device of claim 1, wherein curve information from the navigation system is represented by curve curvature calculated from node data relating to a road, the real curve information is represented by curve curvature calculated from vehicle speed and a turning motion parameter for the vehicle, and when a difference between the curve curvatures is greater than or equal to a threshold value, it is judged that the curve information from the navigation system and the real curve information do not match.

7. The curve approach control device of claim 6, wherein non-matching of polarities of the curve curvatures is taken as one condition for judging that the curve information from the navigation system and the real curve information do not match.

8. The curve approach control device of claim 6, wherein the turning motion parameter is yaw rate or lateral acceleration.

9. The curve approach control device of claim 6, wherein halting of outputting of the control commands continues for a set distance, a set time, or until mismatching is resolved.

10. The curve approach control device of claim 1, wherein halting of outputting of the control commands continues for a set distance, a set time, or until mismatching is resolved.

11. A vehicle equipped with the curve approach control device of claim 1, wherein at least one of alarm control, deceleration control and steering control is executed based on a signal from the curve approach control device.

* * * * *